US012634615B2

(12) United States Patent
Roberts, Jr. et al.

(10) Patent No.: US 12,634,615 B2
(45) Date of Patent: May 19, 2026

(54) CABLE ASSEMBLIES FOR HEADPHONE DEVICES

(71) Applicant: Sonos, Inc., Santa Barbara, CA (US)

(72) Inventors: Ronald W. Roberts, Jr., Melrose, MA (US); Mark Gerlovin, Brookline, MA (US); Mark Viscusi, Wrentham, MA (US)

(73) Assignee: Sonos, Inc., Goleta, CA (US)

( * ) Notice: Subject to any disclaimer, the term of this patent is extended or adjusted under 35 U.S.C. 154(b) by 260 days.

(21) Appl. No.: 18/351,132

(22) Filed: Jul. 12, 2023

(65) Prior Publication Data

US 2024/0007779 A1 Jan. 4, 2024

Related U.S. Application Data

(63) Continuation of application No. 18/149,716, filed on Jan. 4, 2023, now Pat. No. 11,778,359, which is a continuation of application No. 17/303,881, filed on Jun. 9, 2021, now Pat. No. 11,553,269.

(60) Provisional application No. 63/040,312, filed on Jun. 17, 2020.

(51) Int. Cl.

| | |
|---|---|
| ***H04R 1/10*** | (2026.01) |
| ***H01B 7/26*** | (2006.01) |
| ***H04R 1/04*** | (2006.01) |
| ***H04R 5/033*** | (2006.01) |

(52) U.S. Cl.

CPC ............. *H04R 1/1033* (2013.01); *H01B 7/26* (2013.01); *H04R 1/04* (2013.01); *H04R 5/033* (2013.01)

(58) Field of Classification Search

CPC ........ H04R 1/1033; H04R 1/04; H04R 5/033; H01B 7/26

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |

(Continued)

FOREIGN PATENT DOCUMENTS

| | | | |
|---|---|---|---|
| CN | 106469863 A | * | 3/2017 |
| EP | 1389853 A1 | | 2/2004 |

(Continued)

OTHER PUBLICATIONS

Machine translation of CN 106469863 (Year: 2017).*

(Continued)

*Primary Examiner* — Andrew Sniezek

(74) *Attorney, Agent, or Firm* — Secant Intellectual Property Law

(57) ABSTRACT

Headphone playback devices can include a cable assembly including a plurality of conductors extending between a first earpiece and a second earpiece. The cable assembly includes a jacket, a power conductor disposed within the jacket and coupled between a power source in the first earpiece and a wireless transceiver in the second earpiece. The cable assembly further includes a microphone conductor at least partially disposed within the jacket and coupled to a microphone in one of the earpieces. A shield is at least partially disposed between the power conductor and the microphone conductor to reduce electromagnetic interference between the two.

20 Claims, 9 Drawing Sheets

(56) References Cited

U.S. PATENT DOCUMENTS

| | | | | |
|---|---|---|---|---|
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 11,553,269 | B2 * | 1/2023 | Roberts, Jr. | H04R 5/033 |
| 11,778,359 | B2 * | 10/2023 | Roberts, Jr. | H04R 5/033 381/384 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2008/0310665 | A1 * | 12/2008 | Kuhtz | H04R 1/1058 381/375 |
| 2017/0273179 | A1 * | 9/2017 | Kim | H05K 3/022 |
| 2019/0356977 | A1 * | 11/2019 | Ooi | H04R 1/1041 |
| 2020/0068288 | A1 | 2/2020 | Guo et al. | |
| 2021/0089265 | A1 * | 3/2021 | Van Erven | H04R 1/10 |
| 2021/0377672 | A1 * | 12/2021 | Grinnip, III | H04R 5/033 |

FOREIGN PATENT DOCUMENTS

| | | | |
|---|---|---|---|
| WO | 200153994 | | 7/2001 |
| WO | 2003093950 | A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance mailed on Apr. 21, 2023, issued in connection with U.S. Appl. No. 18/149,716, filed Jan. 4, 2023, 9 pages.
Notice of Allowance mailed on Nov. 30, 2022, issued in connection with U.S. Appl. No. 17/303,881, filed Jun. 9, 2021, 8 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

CABLE ASSEMBLIES FOR HEADPHONE DEVICES

CROSS-REFERENCE TO RELATED APPLICATIONS

This application claims the benefit under 35 U.S.C. § 120 as a continuation of U.S. patent application Ser. No. 18/149,716, filed Jan. 4, 2023, titled "CABLE ASSEMBLIES FOR HEADPHONE DEVICES," which claims the benefit under 35 U.S.C. § 120 as a continuation of U.S. patent application Ser. No. 17/303,881, filed Jun. 9, 2021, titled "CABLE ASSEMBLIES FOR HEADPHONE DEVICES," now U.S. Pat. No. 11,553,269, which claims priority to and the benefit of U.S. Patent Application No. 63/040,312, filed Jun. 17, 2020, titled "CABLE ASSEMBLIES FOR HEADPHONE DEVICES," each of which is hereby incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
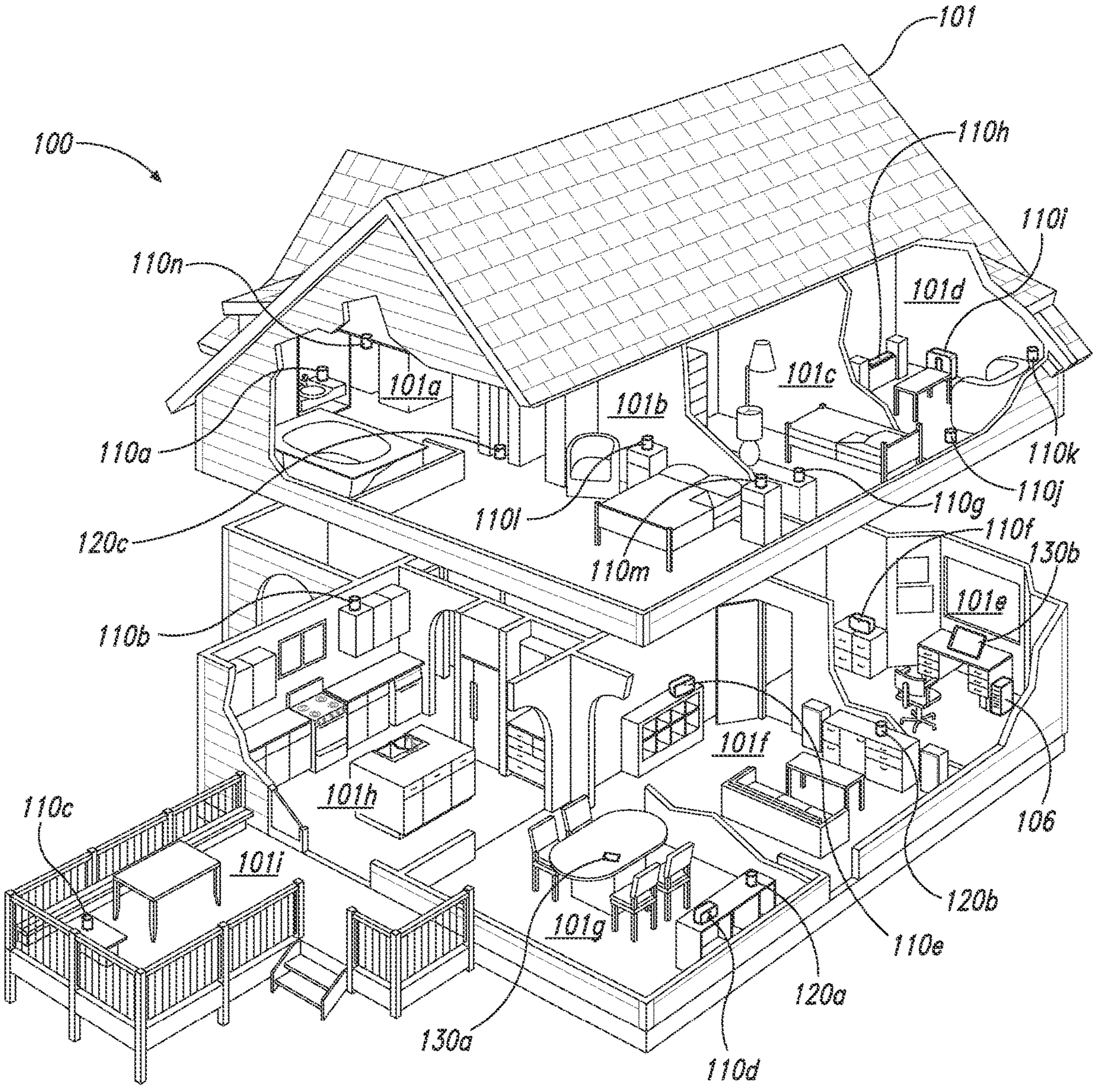
FIG. 1A is a partial cutaway view of an environment having a media playback system configured in accordance with aspects of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Headphone devices often include first and second earpieces that are connected by a headband configured to extend over a user's head while wearing the headphones. Each earpiece may house a single audio transducer, and the headband may house a headbow cable or cable assembly extending within the headband and between the two earpieces. Conventional wireless headphone devices often dispose nearly all of the electronic components and the battery within a single earpiece. Thus, the headbow cable extending between the two earpieces is relatively simple because the cable need only send an audio signal to the remote earpiece to drive an audio transducer therein.

More complex wireless headphone devices may offer additional functionality. For example, such devices may support multiple wireless communications protocols (e.g., both BLUETOOTH and WIFI), along with the ability to receive voice input and perform active noise cancellation, among other functions. These additional features, however, may require distributing the various electronic components among both earpieces, rather than merely grouping them all together in a single earpiece as in conventional designs. For example, a robust WIFI communication system may employ multiple antennas that are spatially diverse including a first antenna disposed in one earpiece and a second antenna disposed in the other earpiece. Examples of such a robust WIFI communication system are described in U.S. patent application Ser. No. 16/844,682, titled "Spatial Antenna Diversity Techniques," filed on Apr. 9, 2020, which is incorporated herein by reference in its entirety. Additionally, both earpieces can include one or more microphones for performing active noise cancellation and/or for detecting voice input.

As a result of the spatial distribution of certain electronic components, the headbow cable assembly may need to support a wider range of signals than in conventional designs. For example, a cable assembly may include one or more conductors configured to carry wireless signals received via a remote antenna in one earpiece to a wireless transceiver disposed within the other earpiece, while also including additional cables and/or conductors separate and apart from the components employed for the received wireless signals. For example, additional electronic components may be integrated into the earpiece that is remote from the power source and processing circuitry, such as one or more microphones for performing active noise cancellation and/or for detecting voice input. In this example, the cable assembly may comprise additional conductors to carry audio input from the microphones in the earpiece that is remote from the processing circuitry.

To support the increased the number of signals traversing the headband via a headbow cable assembly, a plurality of individual conductors need to be disposed within the cable assembly. To maintain acceptable dimensions and flexibility for housing within a headband, the conductors may be tightly grouped together into an outer jacket. However, this arrangement of individual conductors can lead to poor electrical performance of certain components. For example, electrical signals in one conductor may generate electromagnetic interference (e.g., via electromagnetic induction) in another conductor (e.g., distorting the electrical signals carried by the other conductor). Such interference is particularly problematic to the operation of analog sensors (e.g., analog microphones, analog strain gauge(s), analog light sensor(s) (such as light dependent resistor(s)), analog pressure sensor(s), analog temperature sensor(s), analog accelerometer(s), etc.), which can significantly reduce the efficacy of features (e.g., active noise cancellation) that may rely on such sensors. In some examples, electromagnetic interference can generate undesirable audible artifacts.

In some instances, analog sensor signals can be processed to remove or otherwise compensate for noise generated due to electromagnetic interference. However, such compensation is rendered more difficult when the interference is intermittent, as in the case of a power conductor carrying current from a power source in one earpiece to a wireless transceiver in the opposite earpiece. Because the wireless transceiver consumes significant current, and because its current draw may come in brief bursts or peaks of high current draw followed by periods of low current draw, electromagnetic interference caused by power conductors driving wireless communication can be particularly difficult to address with processing techniques alone.

Embodiments of the present technology address these and other challenges by providing a cable assembly in which certain conductors are shielded from one another to reduce or eliminate the risk of electrical interference between the conductors. For example, a shield in the form of one or more grounded conductors extending helically around an active conductor can reduce electromagnetic interference induced within that active conductor as well as reducing electromagnetic interference induced within adjacent conductors. In some examples, such a shield can take the form of a spiral shield extending helically around analog microphone conductor(s) along at least a portion of their lengths. Additionally or alternatively, a spiral shield can extend around power conductor(s) along at least a portion of their lengths. As a result of such an arrangement, the electromagnetic interference generated within the analog microphone conductor(s) (or other conductors) via the power conductor(s) is reduced. Additionally, the use of such spiral shielding can achieve a desirably compact arrangement, as opposed to alternative solutions to the problem of electromagnetic interference, such as arranging conductors in twisted pairs.

In addition to the problems associated with electromagnetic interference, the inclusion of an increased number of conductors within a headbow cable assembly presents challenges for manufacturability of the assembled headphone device. In particular, as each individual conductor must be coupled to its corresponding terminal within each earpiece, a large number of conductors (e.g., 16 conductors) present a challenging case for properly aligning and connecting individual conductors of the cable assembly to the respective terminals within each earpiece. Embodiments of the present technology address these and other problems by providing a termination assembly that maintains respective ends of the individual conductors of the cable assembly in appropriate positions for connecting to electrical contacts of the electronics disposed within each earpiece.

While many aspects of the present technology are described herein with respect to headphone devices, the cable and termination assemblies described herein can be beneficially incorporated into other playback and non-playback devices. For example, aspects of the present technology can be used with any device includes at least one antenna for wireless communication that is remote from the wireless transceiver and power source to which it is coupled.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below with respect to FIGS. 1B-1H.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1H.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some aspects, the playback devices 110*c* and 110*f* play back the hip-hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
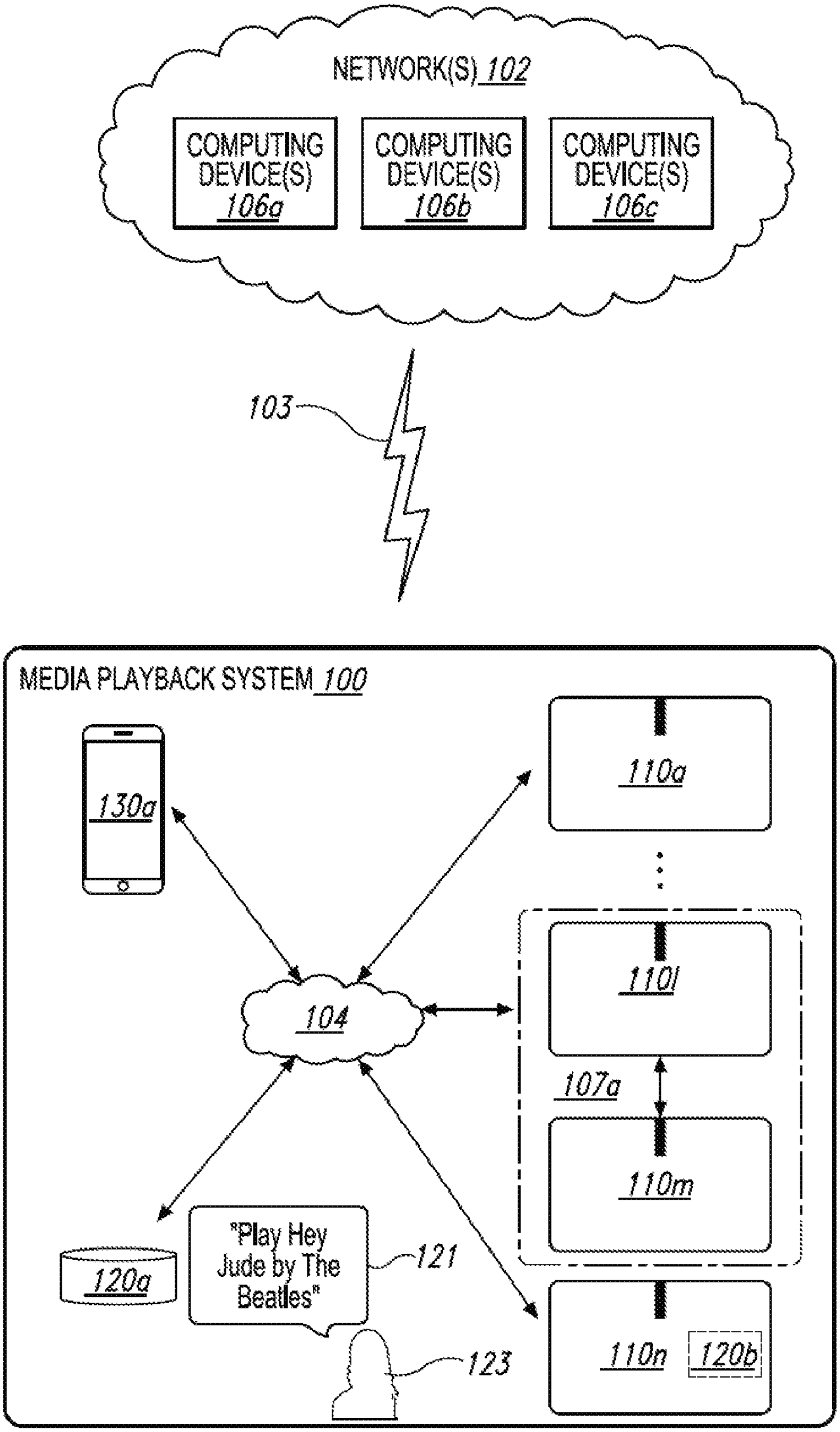
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a BLUETOOTH, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household network). In some examples, the links 103 and the network 104 comprise one or more of the same networks. In some aspects, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices **110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110**.

The media playback system 100 includes the NMDs **120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110**.

b. Suitable Playback Devices

Figure 1C:
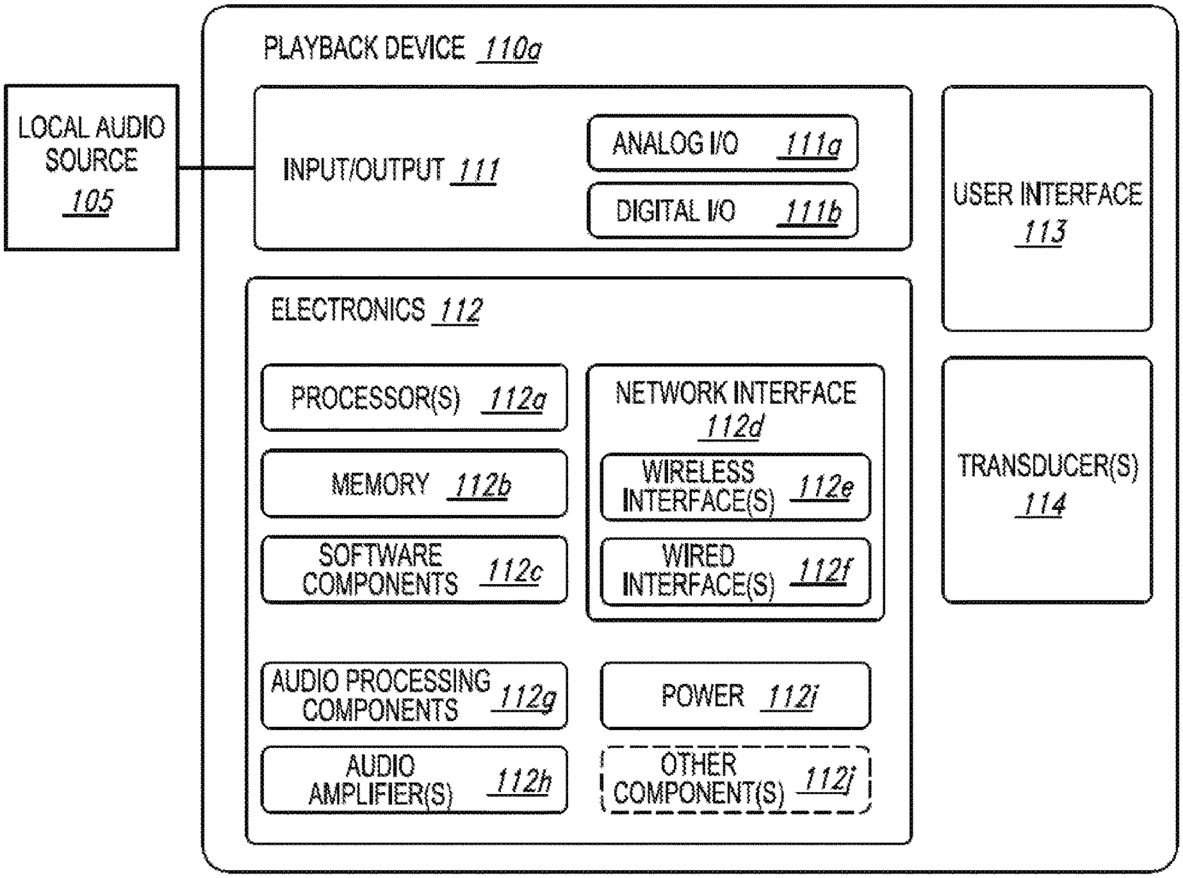
FIG. 1C is a block diagram of a playback device.

FIG. 1C is a block diagram of the playback device **110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b*** comprises a Sony/Philips Digital Interface Format (S/PDIF)

communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, BLUETOOTH, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., BLUETOOTH, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings.

For instance, one or more playback devices 110 may comprise wired or wireless headphone devices (e.g., over-the-ear headphones, on-ear headphones, in-ear earphones). In some examples, the headphone device may be configured to operate in various operational modes dependent upon media-type and/or synchronized devices (e.g., music, home theater, etc.). For example, one mode may be a synchronized playback mode where headphone device plays back audio content that is synchronized with playback of content output by another device. In one example, the synchronized playback mode includes a first headphone device playing back audio that is synchronized with a television set's playback of video corresponding to the audio that the first headphone device is playing back. In some examples, the audio may be home theater or surround sound audio. In another example, the synchronized playback mode includes the first headphone device playing back audio that is synchronized with a second headphone device's playback of the same audio that the first headphone device is playing. In yet another example, the synchronized playback mode includes the first playback device playing back audio that is synchronized with both (i) a television set's playback of video corresponding to the audio that the first headphone device is playing back and (ii) a second headphone device's playback of the same audio that the first headphone device is playing. Another mode may be a non-synchronized playback mode where the first headphone device plays back audio content that is not synchronized with content output by other devices (e.g., headphone device playing only audio content without synchronization to other devices).

Additionally or alternatively, operating a headphone device in a synchronized playback mode, such as a home theater mode, may involve pairing the headphone device with other playback devices described herein. In these examples, the headphone device may, for example, be grouped in a playback zone. An example playback scheme may involve muting the other playback devices in the playback zone while the headphone device is paired. For example, when the headphone device is paired in a playback zone with a home theater system comprising multiple playback devices (e.g., a sound bar, a subwoofer, and a plurality of satellite speakers), the other multiple playback devices may not play back home theater audio while the headphones are paired with the playback zone and playing back the home theater audio. In operation, the other multiple playback devices may mute their playback of the home theater audio, or alternatively, a home theater controller (e.g., a soundbar, surround sound processor, or other device configured to coordinate surround sound playback of the home theater audio among the multiple playback devices) may simply not transmit or otherwise provide the home theater audio information to the multiple playback devices for playback while the headphone is paired in the playback zone and configured to playback the home theater audio. In some examples, the surround sound controller transmits or otherwise provides the home theater audio to the headphones and coordinates the headphone's synchronized playback of the home theater audio with the play back of the home theater audio's corresponding video by the television or other display screen.

Further, in some examples, multiple headphone devices may be paired in the playback zone. In these examples, a playback scheme may involve outputting audio content only on the paired headphone devices and muting the remaining playback devices in the playback zone. For example, when a first headphone device and a second headphone device are both paired in the playback zone with the home theater system comprising the multiple playback devices (e.g., the sound bar, subwoofer, and plurality of satellite speakers), the other multiple playback devices may not play back the home theater audio while the first and second headphones are paired with the playback zone and playing back the home theater audio. As described above, the other multiple playback devices may mute their playback of the home theater audio, or alternatively, the home theater controller may simply not transmit or otherwise provide the home theater audio information to the multiple playback devices for playback while the first and second headphones are paired in the playback zone and configured to playback the home theater audio. In some examples where multiple headphones are paired with the playback zone, the surround sound controller transmits or otherwise provides the home theater audio to the first and second headphones and coordinates the synchronized playback of the home theater audio by the first and second headphones with each other and with the play back of the home theater audio's corresponding video by the television or other display screen.

Figure 1D:
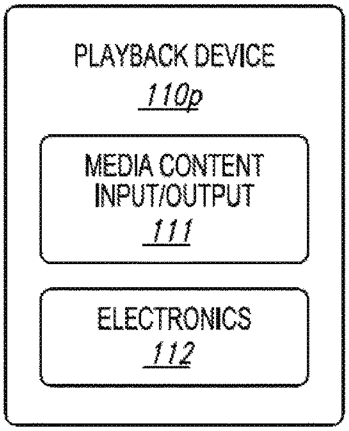
FIG. 1D is a block diagram of a playback device.

In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
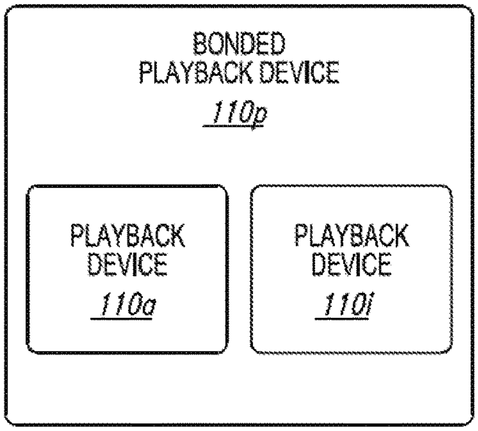
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device.

c. Suitable Network Microphone Devices (NMDs)

Figure 1F:
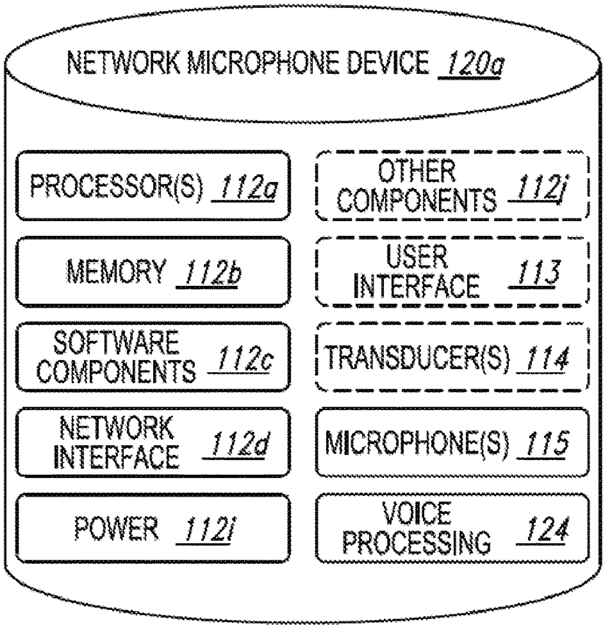
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
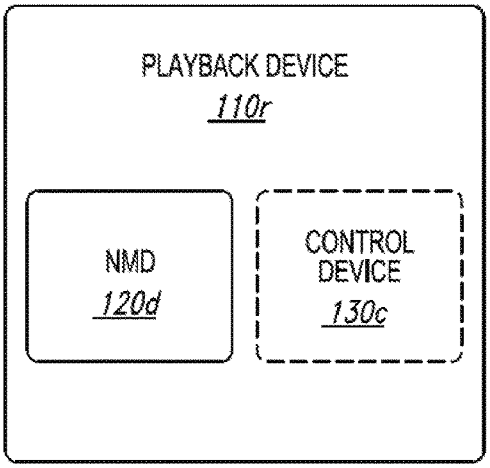
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
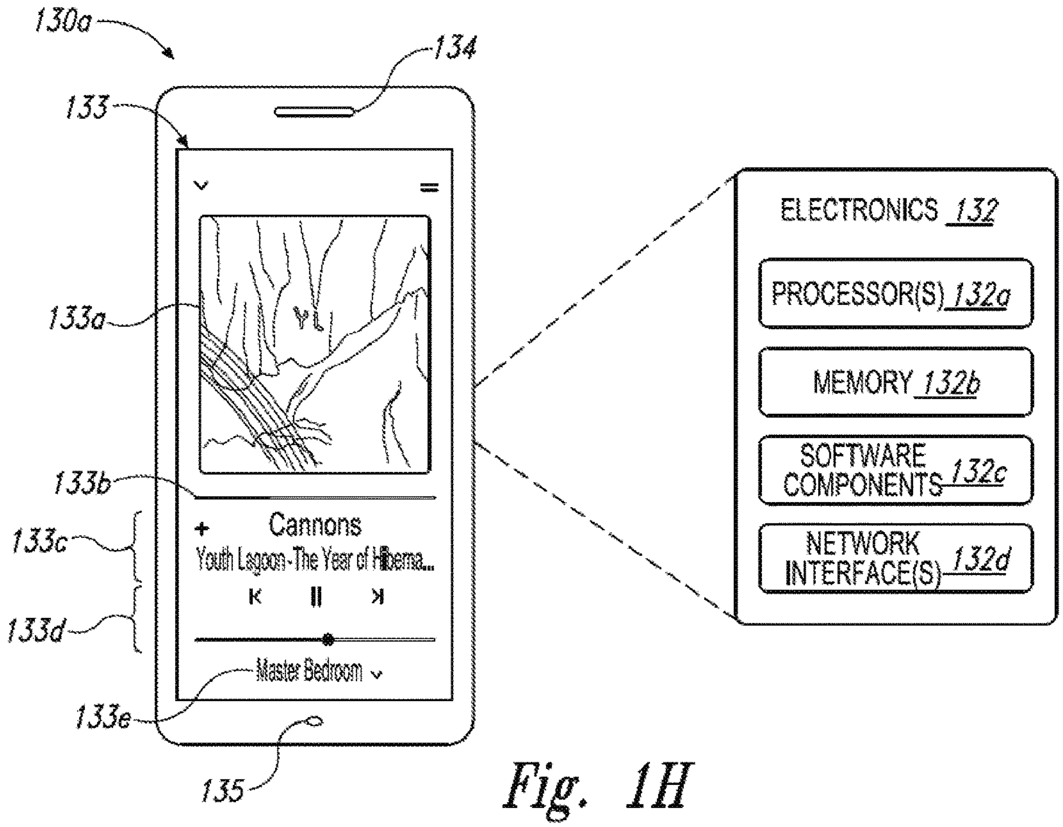
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 112*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Headphone Devices and Cable Assemblies

In some examples, a playback device may be a headphone device. Aspects of the present disclosure relate to a headphone device including one or more analog sensors (e.g., analog microphones for performing active noise cancellation), one or more antennas and wireless transceivers, and other electronic components spatially distributed among the earpieces of the device.

Figure 2:
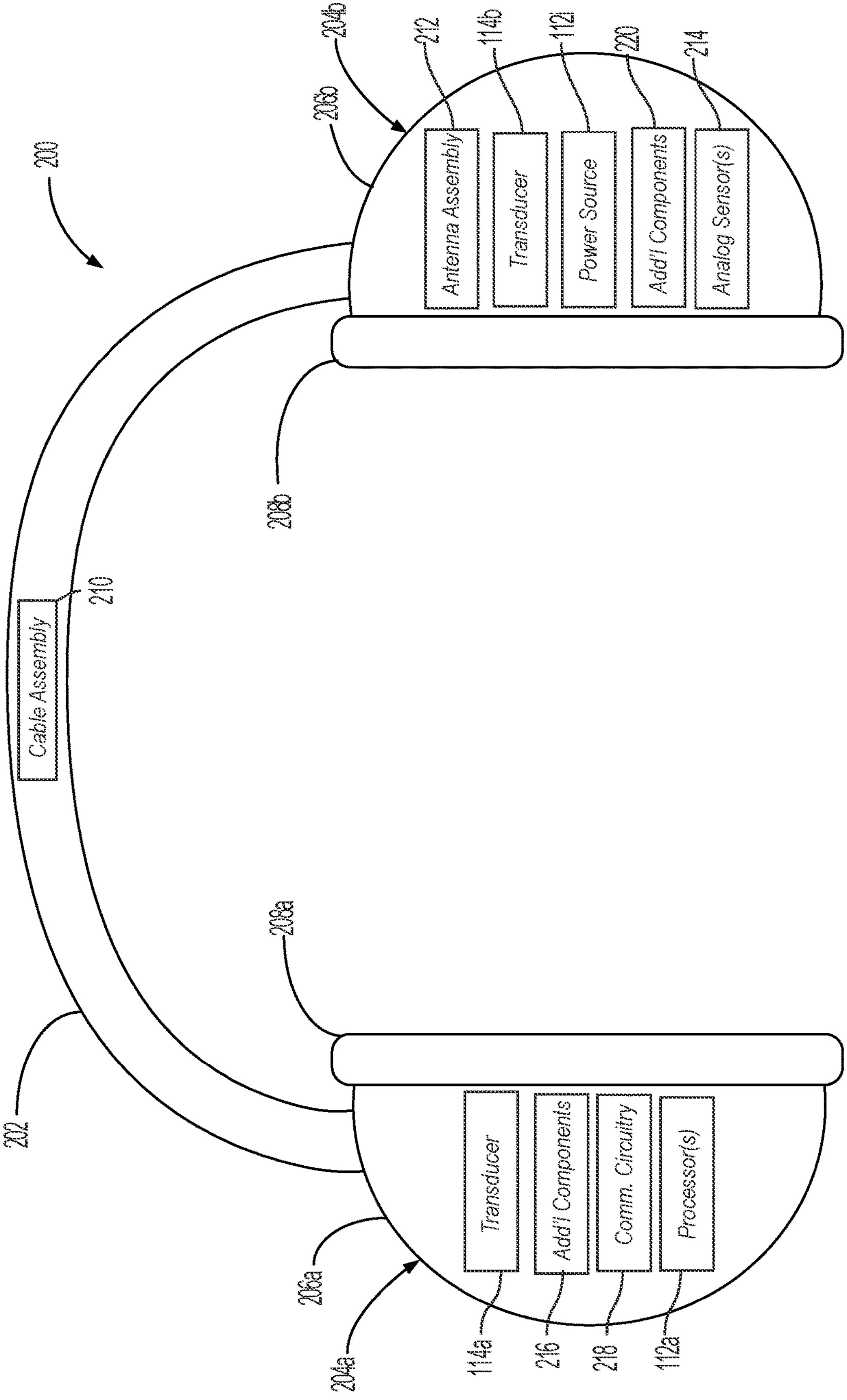
FIG. 2 is a schematic drawing of a headphone device in accordance with examples of the present technology.

FIG. 2 shows some aspects of an example headphone device 200. The headphone device 200 may be implemented as a wearable device such as over-ear headphones, in-ear headphones, or on-ear headphones. As shown, the headphone device 200 includes a headband 202 that couples a first earpiece 204*a* to a second earpiece 204*b*. Each of the earpieces 204*a* and 204*b* includes a respective earcup 206*a* and 206*b*, one or both which may house a number of components therein. Although the illustrated example shows certain components housed within the first earpiece 204*a* and certain other components housed within the second earpiece 204*b*, in various examples some of all of these components can be housed in either earpiece. In some examples, some or all of the components can be duplicated in each earpiece. In some examples, a collection of components are said be enclosed within a headphone housing, which includes the combination of the first and second earpieces 204*a* and 204*b* and the headband 202.

As shown in FIG. 2, the earpieces 204*a* and 204*b* may further include ear cushions 208*a* and 208*b* that are coupled to earcups 206*a* and 206*b*, respectively. The ear cushions 208*a* and 208*b* may provide a soft and compliant barrier between the head of a user and the earcups 206*a* and 206*b*, respectively, to improve user comfort and/or provide acoustic isolation from the surrounding environment (e.g., passive noise reduction (PNR)).

To electrically couple the components in the second earpiece 204*b* with components in the first earpiece 204*a*, the headband includes a cable assembly 210 that connects circuitry disposed within the second earpiece 204*b* to circuitry disposed within the second earpiece 204*b*. The cable assembly 210 may be constructed as, for example, a set of one or more cables that couple (e.g., electrically couple) one or more components at least partially housed by the first earpiece 204*a* with one or more components at least partially housed by the second earpiece 204*b*.

The cable assembly 210 may be constructed as, for example, a set of one or more cables (e.g., a set of one or more flexible cables). At least some of the one or more cables may comprise, for example, any combination of the following: (1) one or more conductors (e.g., one or more solid conductors, one or more stranded conductors, etc.); (2) one or more insulators; (3) one or more shields; and/or (4) one or more jackets. Example cables that may be integrated into the cable assembly 210 include: (1) coaxial cable(s); (2) twisted pair cable(s); (3) solid wire cable(s); and (4) stranded wire cable(s). As described in more detail elsewhere herein, the cable assembly 210 may be constructed in any of a variety of ways.

In some examples, the cable assembly 210 may comprise one or more coaxial cables that may electrically couple the antenna assembly 212 to the communication circuitry 218. The one or more coaxial cables may comprise, for example, any combination of the following: (1) one or more inner conductors; (2) one or more insulators at least partially disposed around the one or more inner conductors; (3) one or more metallic shields at least partially disposed around the one or more insulators; and (4) a jacket at least partially disposed around the one or more metallic shields. Although coaxial cables are advantageous because of durability, low noise, and ease of manufacture and implementation for the example headphone configuration(s) described herein, the cable assembly 210 may comprise other types of cables in place of a coaxial cable or in combination with a coaxial cable. For example, in some examples, the cable assembly 210 may include a triaxial cable, a ribbon cable, or any other cable configuration suitable for connecting electrical components in the first earpiece 204*a* with electrical components in the second earpiece 204*b*.

As shown in FIG. 2, the first and second earpieces 204*a* and 204*b* include first and second transducers 114*a* and 114*b*, respectively. As noted previously, while conventional headphone devices arrange nearly all of the non-transducer components in a single earpiece, example of the present technology include headphone devices in which the non-transducer components are distributed among the two earpieces. For example, as shown in FIG. 2, the first earpiece 204*a* includes, in addition to the first transducer 114*a*, one or more processors 112*a*, communication circuitry 218 (e.g., wireless radios, front-end circuitry, switches, and/or filters), and one or more additional components 216. In various examples, the additional components 216 can include one or more of: analog sensor(s) (e.g., analog microphone(s), analog strain gauge(s), analog light sensor(s), analog pressure sensor(s), analog temperature sensor(s), analog accelerometer(s), etc.), digital microphone(s), processing circuitry, a near-field communication assembly, a capacitive touch-sensor assembly, communications circuitry, active noise-cancellation circuitry, a battery, battery-charging circuitry, user-input components (e.g., buttons, switches, dials, etc.), or any other suitable components.

In the example shown in FIG. 2, the second earpiece 204*b* includes, in addition to the second transducer 114*b*, an antenna assembly 212, analog sensor(s) 214 (e.g., analog microphone(s), analog strain gauge(s), analog light sensor(s), analog pressure sensor(s), analog temperature sensor(s), analog accelerometer(s), etc.), a power source 112*i* (e.g., a rechargeable battery), and additional components 220. The additional components can include one or more of: digital microphone(s), active noise cancellation circuitry, a near-field communication assembly, a capacitive touch-sensor assembly, battery-charging circuitry, user-input components (e.g., buttons, switches, dials, etc.), or any other suitable components.

When equipped with microphones, the headphone device 200 can operate as an NMD configured to receive voice input from a user and correspondingly perform one or more operations based on the received voice input. Additionally or alternatively, the microphones may be used for active noise cancellation (ANC) and/or active noise reduction (ANR).

In the example shown in FIG. 2, the components in the first earpiece 204*a* can be configured to receive power from the power source 112*i*, which is disposed in the second earpiece 204*b*. As such, the cable assembly 210 can include one or more power conductors configured to couple the power source 112*i* to the electronic components in the first earpiece 204*a*. Additionally, the analog sensor(s) 214 are disposed in the second earpiece 204*b*, while the processor 112*a* is disposed in the first earpiece 204*a*. In operation, input from the analog sensor(s) 214 can be relayed to the processor(s) 112*a* via one or more analog sensor conductors extending within the cable assembly 210. In the case of analog microphones, one or more microphone conductors can carry analog audio input signals from the second earpiece 204*b* to the electronic components within the first earpiece 204*a*, where the signals can be used to perform active noise cancellation or other processes.

The antenna assembly 212 can include one or more antennas configured to communicate over one or more wireless networks. Example wireless networks include: a WI-FI network, a BLUETOOTH network, an LTE network, a Z-Wave network, a 5G network, and a ZIGBEE network. Although a single antenna assembly 212 is shown in the first earpiece 204*a*, in some instances an additional one or more antenna assemblies can be disposed in the second earpiece 204*b*. In some examples, the antenna assembly 212 includes one or more multi-band antennas configured to operate on several frequency bands (e.g., two or more of: the 2.4 GHz band, the 5 GHz band, or the 6 GHz band), such as a dual-band inverted-F antenna (IFA). Further, in some examples, one or more antennas of the assembly 212 may be passive multi-band antennas, active multi-band antennas, or a combination thereof. In some examples, the antenna assembly 212 can include a single-band antenna configured to operate on a single frequency band (e.g., the 2.4 GHz band, the 5 GHz band, or the 6 GHz band).

It should be appreciated that the headphone device 200 may employ any number of antennas and is not limited to implementations with any particular number of antennas. For example, the headphone device 200 may comprise two antennas for communication over WIFI and/or BLUETOOTH and a third antenna for near-field communication.

In some examples, the communication circuitry 218 may comprise any of a variety of electronic components that enable transmission and/or receipt of wireless signals via the antenna assembly 212. Examples of such components include receivers, transmitters, processors, memory, amplifiers, switches, and/or filters.

The communication circuitry 218 is further configured to cause the headphone device 200 to wirelessly communicate with at least one external device, such as a control device 130 or other network device, based at least in part on the current mode of operation. The control device 130 may be, for example, a smartphone, tablet, computer, etc.

As noted previously, distributing electronic components among the earpieces 204*a* and 204*b* of the headphone device 200 can present certain challenges to operation of the headphone device 200. In particular, the cable assembly 210 must carry current from the power source 112*i* in the second earpiece 204*b* to the communication circuitry 218 in the first earpiece 204*a*. Because of the relatively high current levels required, there is significant risk of inducing electromagnetic interference in other conductors within the cable assembly 210. Additionally, because operation of the communication circuitry 218 may include bursts of high current levels followed by periods of low current levels, such electromagnetic interference can be difficult to remove or otherwise compensate for using filters or other processing techniques. Electromagnetic interference can be particularly problematic in the case of conductor(s) carrying signals from the analog sensors 214 in the second earpiece 204*b* to the processor(s) 112*a* in the first earpiece 204*a*, as noise in the analog signal can significantly degrade device performance, for example by reducing the efficacy of active noise cancellation processes that are based at least in part on input from the analog sensor(s) 214.

To reduce electromagnetic interference in the analog sensor conductors, one or more of the conductors within the cable assembly 200 can be shielded along at least a portion of its length. Such shielding can take the form of a grounded conductor (e.g., metallic wire) extending helically around one or more active conductors. In various examples, the shielding can include a spiral shield, a braid shield, a foil shield, any combination thereof, or any other suitable shielding configured to reduce or eliminate electromagnetic interference between individual conductors of the cable assembly 210.

Figure 3A:
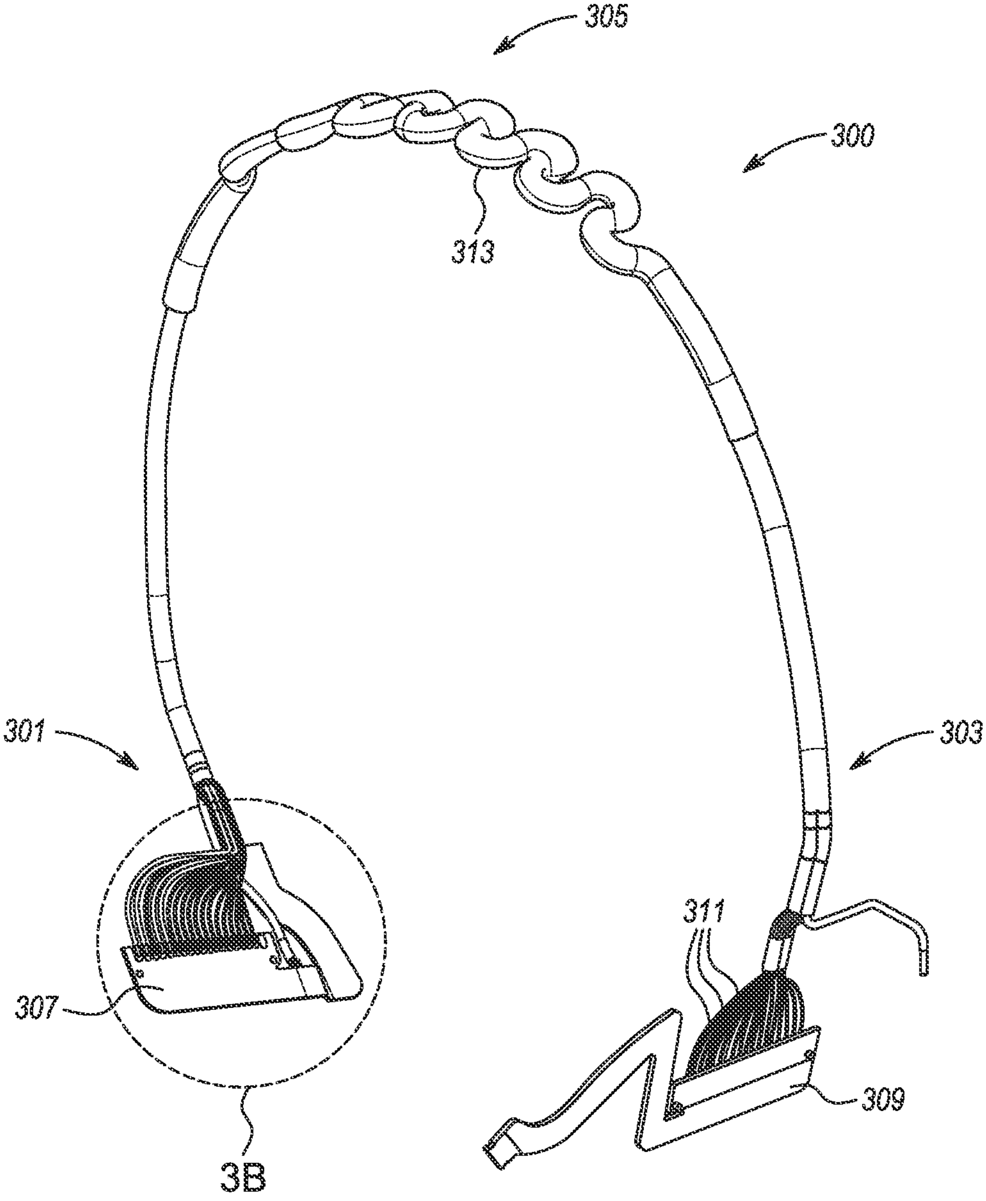
FIG. 3A is a perspective view of a cable assembly of a headphone device in accordance with examples of the present technology.

FIG. 3A is a perspective view of an example cable assembly 300 of a headphone device. The cable assembly 300 includes a first end portion 301 configured to be coupled to and/or housed at least partially within a first earpiece, a second end portion 303 configured to be coupled to and/or housed at least partially within a first earpiece, and an intermediate portion 305 therebetween that is configured to be at least partially disposed within a headband.

A first termination assembly 307 is disposed at the first end portion 301, and a second termination assembly 309 is disposed at the second end portion 303. In an assembled state, the first and second termination assemblies 307, 309 can be disposed within respective earpieces of the headphone device. The cable assembly 300 includes a plurality of individual conductors 311 (e.g., 10 or more individual conductors, for example, 16 individual conductors) extending between the first termination assembly 307 and the second termination assembly 309. The individual conductors 311 can be joined together within an outer jacket 313 along at least a portion of their respective lengths. In various examples, the individual conductors 311 can assume any suitable size, construction, composition, or configuration. For example, the individual conductors 311 can take the form of twisted conductor pairs, coaxial conductors, or single stranded conductors, and may include any suitable insulation or shielding. Additionally, the cable assembly 300 can include one or more fillers such as nylon rods or other suitable material to provide a suitable fit within the jacket 313. In various examples, the jacket 313 can have an outer diameter of between about 1-6 mm, for example between about 4-6 mm, or approximately 4.5 mm.

The jacket 313 can extend over the individual conductors 311 within the intermediate portion 305 of the assembly 300. The jacket 313 can be made of any suitable material that is sufficiently flexible to accommodate bending, stretching, and other movement of the cable assembly 300. For example, the jacket 313 may be at least partially formed from one or more elastomeric materials. Examples of such elastomeric materials include rubbers (e.g., latex rubbers, silicone rubbers, nitrile rubbers, butyl rubbers, chloroprene rubbers, styrene-butadiene rubbers, and polyacrylic rubbers), thermoplastic elastomers (e.g., thermoplastic polyurethane (TPU)), and elastolefins. The intermediate portion 305 can be configured to assume a serpentine, undulating, or other such shape having a plurality of bends while at rest. For example, the intermediate portion 305 may be heat-formed into such a shape having a plurality of bends. When the cable assembly 300 is extended (e.g., by a user pulling the earpieces containing the termination assemblies downwardly away from the crown of the user's head while wearing the assembled device), the intermediate portion 305 can elongate by reducing the degree of bending or curvature within the intermediate portion without risking damage to the individual conductors 311 contained within the jacket 313. As shown in FIG. 3A, the jacket 313 may extend only over the intermediate portion 305 of the assembly 300, with the individual conductors 311 extending out of the jacket at or near both the first and second end portions 301, 303.

Figure 3B:
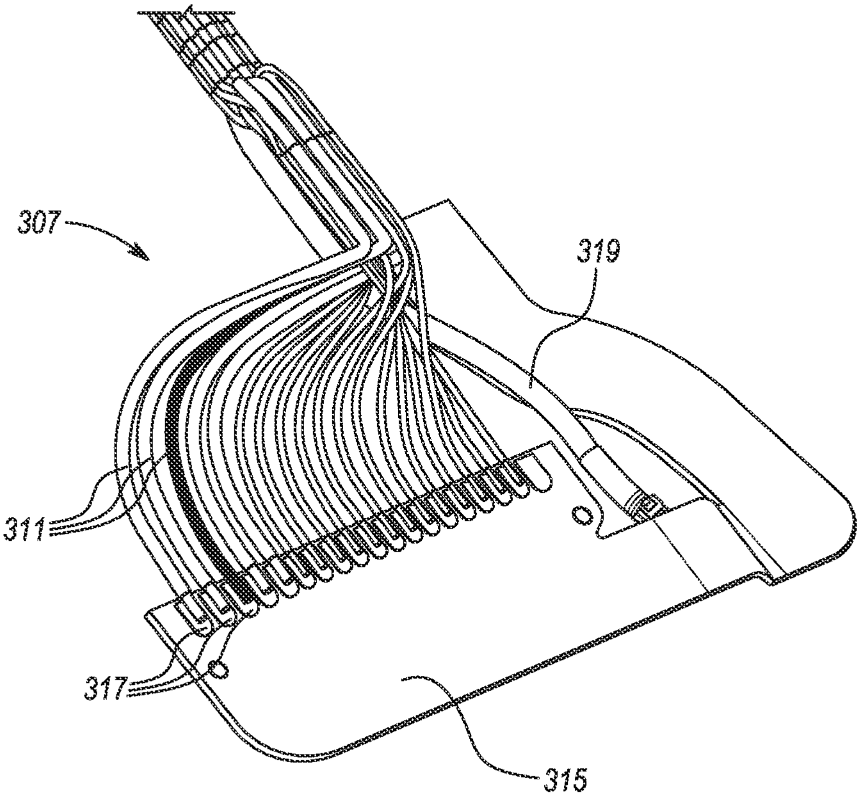
FIG. 3B is an enlarged detail view of the termination assembly shown in FIG. 3A.

FIG. 3B illustrates an enlarged detail view of the first termination assembly 307. In various examples, the first and second termination assemblies 307 and 309 can include similar (and/or identical) features and components. As shown in FIG. 3B, the first termination assembly 307 can include a circuit board 315 (e.g., a flexible circuit board such as a flexible printed circuit board (PCB)) having a plurality of terminals 317 thereon. In various examples, the terminals 317 can take the form of conductive pads, conductive traces, solder pads, or other suitable features configured to facilitate mechanical and electrical interconnection between traces on the circuit board 315 and individual conductors 311 of the cable assembly 300. The circuit board 315 can, in turn, be electrically coupled to the other electronic components disposed within the earpiece (e.g., microphones, processor(s), radios, antennas, etc.). In some examples, some or all of the individual conductors 311 of the cable assembly can be mechanically joined to the terminals 317 of the termination assembly 307 via soldering, for example using a hot-bar soldering approach. For example, some or all of the conductors 311 can have terminuses in which any surrounding insulator has been removed, leaving an exposed conductive tip. The exposed conductive tip(s) can be coated with tin to facilitate soldering to the terminals 317 of the termination assembly 307.

As shown in FIG. 3B, individual conductors 311 of the cable assembly 300 can be fanned out at the junction with the termination assembly 307, with individual conductors 311 diverging from one another and substantially aligned along a plane to facilitate bonding to the circuit board 315 of the termination assembly 315. Once the individual conductors 311 are soldered or otherwise mechanically and electrically coupled to the terminals 317 of the termination assembly 307 an insulative material can be disposed over the terminals 317.

In some examples, at least some of the individual conductors 311 may not be coupled to terminals 317 of the termination assembly 307. For example, an antenna conductor 319 can be coupled directly to an antenna assembly without being coupled to a terminal 317 of the termination assembly 307.

In various examples, the first and second termination assemblies 307 and 309 can include one or more shielding elements which can reduce or remove electromagnetic interference between the conductors 311 and/or between the individual terminals 317. These shielding elements can include any desired shielding element and can be implemented in any desired manner. For example, the shielding elements can include guard traces, which are grounded traces disposed between the conductors 311 and the terminals 317 of the termination assemblies 307 and 309.

Figure 4A:
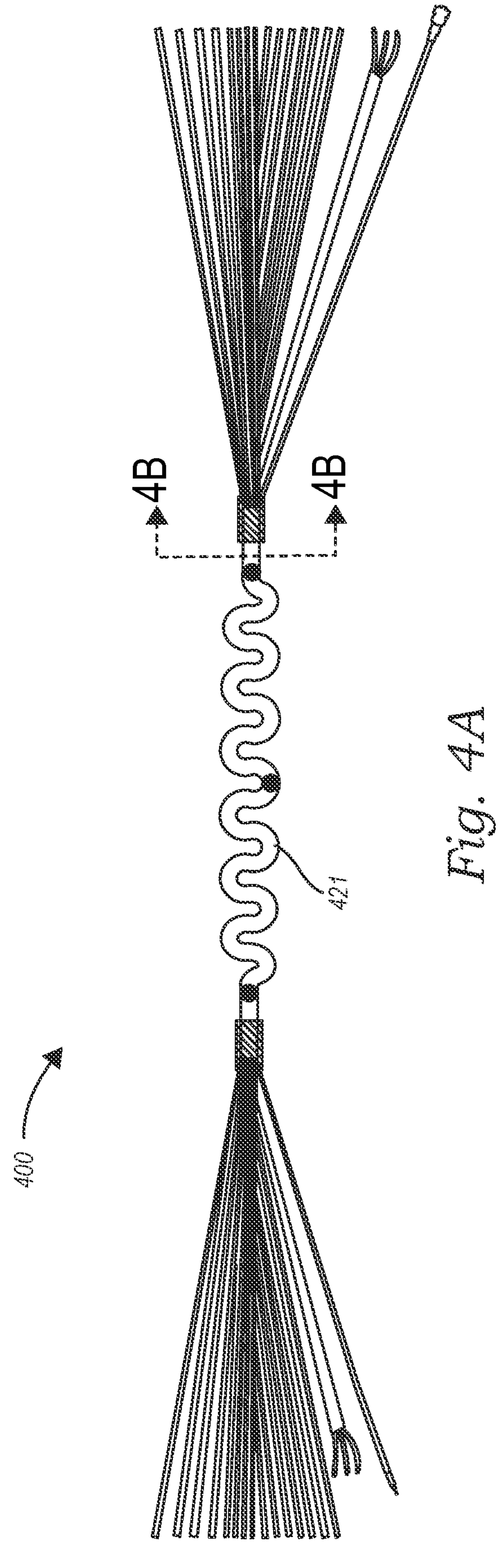
FIG. 4A is a schematic laid-flat view of a portion of a cable assembly of a headphone device in accordance with examples of the present technology.
Figure 4B:
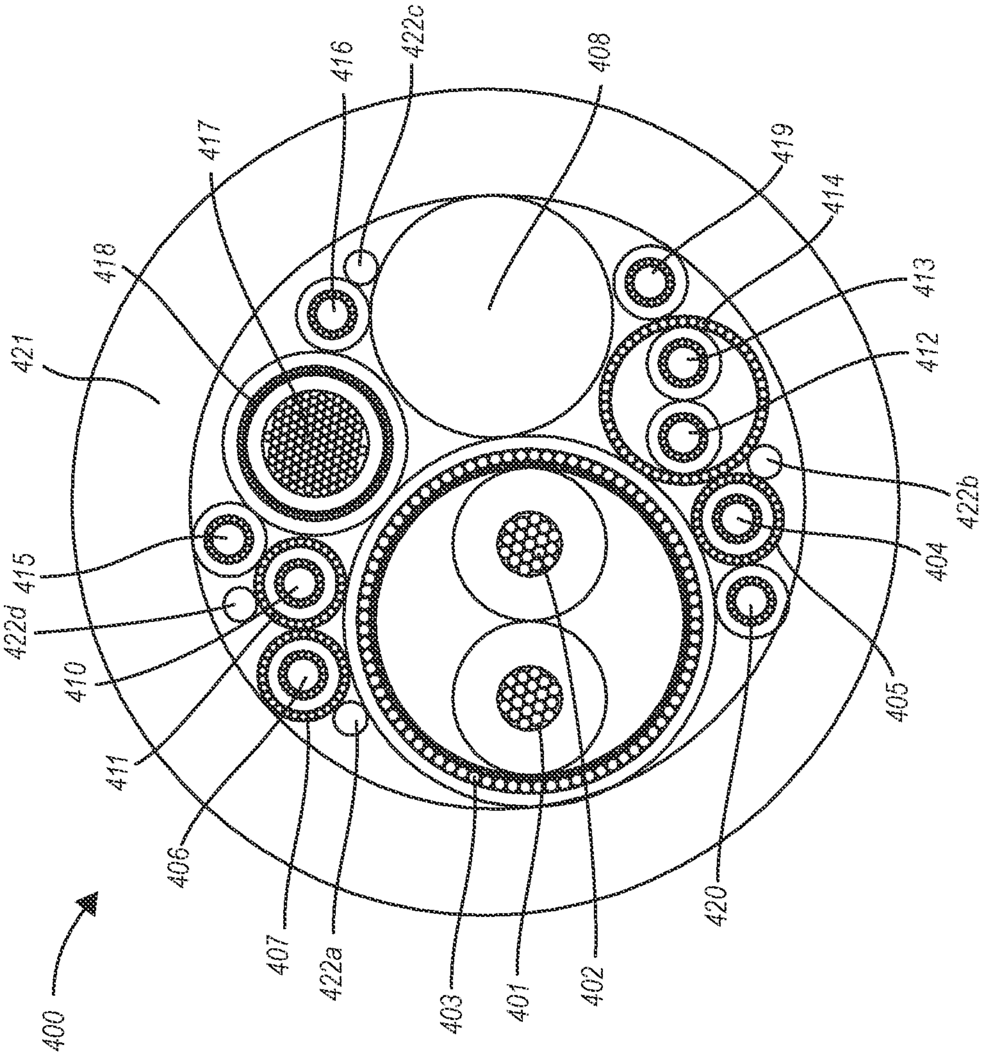
FIG. 4B is a schematic cross-sectional view of the cable assembly taken along line 4B-4B shown in FIG. 4A.

FIG. 4A is a schematic laid-flat view of a portion of a cable assembly 400 of a headphone device, and FIG. 4B depicts an example cross-sectional view taken along line 4B-4B in FIG. 4A. The cable assembly 400 can include some or all of the features of the cable assemblies 300 and 210 described elsewhere herein. The termination assemblies (shown in FIGS. 3A and 3B) are omitted in FIG. 4A for clarity. The cable assembly 400 shown in FIGS. 4A and 4B comprises a plurality of individual conductors (shown as conductors 401-420), insulation, and fillers (shown as fillers 422*a*—d), which are all disposed within an outer jacket (shown as jacket 421) along an intermediate portion of the cable assembly 400. As described previously with respect to FIG. 3B, at the ends of the cable assembly, the individual conductors of the cable assembly 400 can extend beyond the jacket 421 and fan outwardly for connection to electronic components of the headphone device (e.g., via the termination assemblies 307, 309 shown in FIG. 3A).

As noted previously, it can be beneficial to provide shielding around at least some of the conductors of the cable assembly. In particular, a power conductor which carries current from a power source in one earpiece to electronic components in the other earpiece may generate undesirable electromagnetic interference in the conductors carrying analog sensor signals (e.g., analog microphone signals). Accordingly, either or both of the power conductor(s) and the analog sensor conductor(s) can be electrically shielded from one another. In some examples, such shielding can take the form of a conductor (e.g., copper wire or other suitable metallic material) that extends helically around the power conductor(s) and/or the analog sensor conductor(s). The shielding can be, for example, a spiral shield, braid shield, foil shield, any combination thereof, or any other suitable electrical shielding. The shield(s) can be electrically grounded.

As shown in FIG. 4B, the cable assembly 400 may be implemented using a set of one or more distinct cables integrated within a single outer jacket. In some examples, one or more of the conductors may be arranged in twisted pairs (e.g., in a twisted pair cable). Arranging the conductors in such a fashion (e.g., as a twisted pair) may advantageously reduce electromagnetic radiation, reduce crosstalk, and improve noise rejection. Additionally or alternatively, one or more of the conductors can be surrounded along at least a portion of their respective lengths by shielding. Such shielding can take the form of a spiral shield, a foil shield, braid shield, or other suitable structure configured to reduce electromagnetic interference and crosstalk.

In some examples, one or more of the elements 401-422 may be stranded conductors. For example, the conductors that transfer power and/or carry audio signals (e.g., originating from a microphone or being provided to a transducer) may be stranded to advantageously improve the flexibility of the cable assembly. These stranded conductors may be insulated using, for example, a thin film polymer and/or an enamel type insulation.

The structure and function of the particular elements 401-422 shown in FIG. 4B may vary based on the particular implementation. One example implementation of each of element 401-422 in FIG. 4B shown in Table 1 below:

TABLE 1

Example Cable Assembly Specification for Cable Assemblies shown in FIG. 4B

| Element Number | Type | AWG/ Diameter | Function |
|---|---|---|---|
| 401 | Twisted Pair with | 30 AWG | USB+ |
| 402 | Surrounding Shield | 30 AWG | USB− |
| 403 | | | GND/Shield |

TABLE 1-continued

Example Cable Assembly Specification for Cable Assemblies shown in FIG. 4B

| Element Number | Type | AWG/ Diameter | Function |
|---|---|---|---|
| 404 | Conductor with Surrounding | 34 AWG | I2C Serial Clock Line (SCL) |
| 405 | Shield | | GND/Shield |
| 406 | Conductor with Surrounding | 34 AWG | I2C Serial Data Line (SDL) |
| 407 | Shield | | GND/Shield |
| 408 | Coaxial Cable | 1.37 mm | Antenna |
| 410 | Conductor with | 34 AWG | Audio+ |
| 411 | Surrounding Shield | | Audio− |
| 412 | Twisted Pair with Surrounding Shield | 34 AWG | Analog Microphone+ |
| 413 | | 34 AWG | Analog Microphone− |
| 414 | | | Spiral Shield |
| 415 | Stranded Conductor | 34 AWG | PSOC |
| 416 | Stranded Conductor | 34 AWG | INT |
| 417 | Stranded Conductor | 24 AWG | Power + GND/ |
| 418 | with Shield | | Spiral Shield |
| 419 | Stranded Conductor | 34 AWG | Digital Microphone Power |
| 420 | Stranded Conductor | 34 AWG | RTC Battery |
| 421 | TPU | 4.5 mm | Jacket |
| 422a-d | Nylon | | Filler |

As noted in Table 1, in the example shown in FIG. 4B there is a spiral shield 418 that coaxially surrounds the power conductor 417. Additionally, a spiral shield 414 is disposed around both the positive and negative analog microphone conductors 412, 413, which may themselves be arranged in a twisted pair. In various examples, one or both of the spiral shields 414, 418 can be omitted, replaced with other shield configurations, or otherwise modified to achieve the desired performance. As noted previously, the spiral shielding 418 disposed around the power conductor 417 and the spiral shield 414 disposed around the analog microphone conductors 412, 413 can both serve to insulate the analog microphone conductors 412, 413 from electromagnetic interference generated by the power conductor 417. Reducing this interference can improve operation of the device, for example by improving active noise cancellation, which relies at least in part on signals carried by the analog microphone conductors 412, 413.

It should be appreciated that the particular implementation of elements 401-422 shown Table 1 above is only one example implementation and the elements 401-422 may be constructed in other ways. For example, cable assembly may use additional conductors or fewer conductors (e.g., to accommodate a different number of components such as microphones). Further, the diameter of any portion of the elements 401-422 may be changed. In various examples, any one or any subset of the conductors 401-420 can be surrounded along at least a portion of their lengths by a suitable shield (e.g., spiral shield, braid shield, foil shield, or any combination thereof).

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

It should be appreciated that the cable assemblies described herein may be readily applied to devices separate and apart from playback devices and/or NMDs. For example, the techniques described herein may be employed in wearable devices separate and apart from headphone devices such as a pair of smart glasses. Implementing audio input and wireless communications capability in a pair of smart glasses may present similar problems to those described above with respect to headphones (e.g., the need to distribute electronic components about the housing along with the need for wireless communication and analog sensor input). In such a smart glasses implementation, the smart glasses may comprise a housing including a frame front (e.g., configured to hold one or more lenses), a first temple rotatably coupled to the frame front, and a second temple rotatable coupled to the frame front. A cable assembly may be at least partially housed in any suitable location, for example on or in the frame front, disposed in the left temple, disposed in the right temple, distributed between the frame front and the temples, etc.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Examples

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1. A headphone device comprising: a first earpiece; a second earpiece; at least one microphone at least partially disposed in at least one of the first earpiece or the second earpiece; a wireless transceiver at least partially disposed in the first earpiece; a power source at least partially disposed in the second earpiece; a cable assembly extending between the first earpiece and the second earpiece, the cable assembly comprising: a jacket; one or more power conductors at least partially disposed within the jacket and coupled between the power source and the wireless transceiver; one or more microphone conductors at least partially disposed within the jacket and coupled to the at least one microphone; and a shield at least partially disposed between the one or more power conductors and the one or more microphone conductors.

Example 2. The headphone device of any one of the Examples herein, wherein the shield comprises one or more conductors helically extending around at least one of the one or more power conductors.

Example 3. The headphone device of any one of the Examples herein, wherein the shield comprises a spiral shield.

Example 4. The headphone device of any one of the Examples herein, wherein the shield is a first shield and wherein the cable assembly further comprises a second shield at least partially disposed within the jacket and comprising one or more conductors helically extending around the one or more microphone conductors.

Example 5. The headphone device of any one of the Examples herein, wherein at least one of the first shield or the second shield comprises a spiral shield.

Example 6. The headphone device of any one of the Examples herein, wherein the wireless transceiver is configured to facilitate communication via at least one data network, wherein the at least one data network comprises at least one of: a wireless local area network (WLAN) or a personal area network (PAN).

Example 7. The headphone device of any one of the Examples herein, wherein the wireless transceiver is configured to operate in a plurality of operation modes including a first operation mode and second operation mode, wherein the wireless transceiver facilitates communication via at least one WIFI network in the first operation mode, and wherein the wireless transceiver facilitates communication via at least one BLUETOOTH network in the second operation mode.

Example 8. The headphone device of any one of the Examples herein, wherein the jacket has an outer diameter between 1 millimeter (mm) and 6 mm.

Example 9. The headphone device of any one of the Examples herein, wherein the outer diameter of the jacket is between 4 mm and 6 mm.

Example 10. The headphone device of any one of the Examples herein, further comprising a housing including the first earpiece and the second earpiece, wherein the housing is an over-ear housing, an on-ear housing, or an in-ear housing.

Example 11. The headphone device of any one of the Examples herein, further comprising a headband attached to the first earpiece and the second earpiece and wherein the cable assembly comprises: a first end portion coupled to one or more components at least partially disposed in the first earpiece; a second end portion coupled to one or more components at least partially disposed in the second earpiece; and an intermediate portion between the first end portion and the second end portion, wherein the intermediate portion is at least partially disposed in the headband.

Example 12. The headphone device of any one of the Examples herein, wherein at least part of the intermediate portion is in a configuration that comprises a plurality of bends.

Example 13. The headphone device of any one of the Examples herein, wherein the cable assembly further comprises a termination assembly disposed in the first earpiece, wherein the termination assembly comprises: a flexible circuit board including a plurality of conductive traces; and a plurality of terminals coupled to the plurality of conductive traces.

Example 14. The headphone device of any one of the Examples herein, wherein at least one of the one or more microphone conductors are soldered to at least one of the plurality of terminals.

Example 15. The headphone device of any one of the Examples herein, wherein the at least one microphone comprises at least one analog microphone.

Example 16. A wearable device comprising: a housing configured to be worn about a head of a subject; a power source at least partially disposed in the housing and disposed on a first side of the subject when the wearable device is worn about the head; at least one analog sensor at least partially disposed in the housing; a wireless radio at least partially disposed in the housing and disposed on a second, opposite side of the subject when the wearable device is worn about the head; a cable assembly at least partially disposed in the housing and comprising: one or more power conductors coupled between the power source and the wireless radio; one or more sensor conductors coupled to the at least one analog sensor; and a shield at least partially separating the one or more power conductors from the one or more sensor conductors, wherein the shield comprises one or more conductors helically extending around at least one of the one or more power conductors.

Example 17. The wearable device of any one of the Examples herein, wherein the at least one analog sensor comprises at least one analog microphone.

Example 18. The wearable device of any one of the Examples herein, wherein the housing comprises a frame front, a first temple rotatable coupled to the frame front, and a second temple rotatably coupled to the frame front.

Example 19. The wearable device of any one of the Examples herein, wherein the housing comprises a first earpiece and a second earpiece.

Example 20. A cable assembly for a headphone device including a first earpiece and a second earpiece, the cable assembly comprising: a jacket having an outer diameter between 4 millimeters (mm) and 6 mm; an inner coaxial cable at least partially disposed within the jacket, wherein the inner coaxial cable comprises a first end configured to electrically couple to an antenna at least partially disposed in the second earpiece and a second end configured to electrically couple to a wireless transceiver at least partially disposed in the first earpiece; one or more power conductors at least partially disposed within the jacket, wherein the one or more power conductors comprises a first end configured to electrically couple to a battery at least partially disposed in the second earpiece and a second end configured to couple to the wireless transceiver at least partially disposed in the first earpiece; one or more microphone conductors at least partially disposed within the jacket, wherein the one or more microphone conductors includes a first end configured to couple to electrically couple to at least one microphone; and a shield at least partially disposed between the one or more power conductors and the one or more microphone conductors, wherein the shield comprises one or more conductors helically extending around at least one of the one or more power conductors.

Example 21. The cable assembly of any one of the Examples herein, further comprising a termination assembly coupled to the conductors, the termination assembly comprising: a flexible circuit board including a plurality of conductive traces; and a plurality of terminals coupled to the plurality of conductive traces.

Example 22. The cable assembly of any one of the Examples herein, wherein at least one of the one or more microphone conductors is soldered to at least one of the plurality of terminals.

The invention claimed is:

1. A headphone device comprising:

a first earpiece;

a first audio transducer housed within the first earpiece;

a second earpiece;

a second audio transducer housed within the second earpiece;

a plurality of electrical components including a wireless transceiver and a power source, a first subset of the plurality of electrical components being at least partially disposed in the first earpiece and a second subset of the plurality of electrical components being at least partially disposed in the second earpiece; and a cable assembly extending between the first earpiece and the second earpiece, the cable assembly comprising a plurality of conductors electrically connecting the first subset of the plurality of electrical components to the second subset of the plurality of electrical components, a jacket at least partially enclosing the plurality of conductors, and a first termination assembly disposed in the first earpiece, wherein the first termination assembly includes a flexible circuit board including a plurality of terminals electrically and mechanically connected to one or more of the plurality of conductors, wherein the plurality of terminals are arranged side-by-side on the flexible circuit board such that ends of the plurality of conductors mechanically connected to the plurality of terminals are aligned along a plane.

2. The headphone device of claim 1, wherein at least one of the plurality of conductors is soldered to at least one of the plurality of terminals.

3. The headphone device of claim 1, wherein the cable assembly further comprises a second termination assembly disposed in the second earpiece.

4. The headphone device of claim 1, wherein the wireless transceiver is configured to facilitate communication via at least one data network, wherein the at least one data network comprises a BLUETOOTH network.

5. The headphone device of claim 1, further comprising an over-ear housing including the first earpiece, the second earpiece, and a headband attached to the first earpiece and the second earpiece, and wherein the cable assembly further comprises:

a first end portion coupled to the first subset of the plurality of electrical components via the first termination assembly;

a second end portion coupled to the second subset of the plurality of electrical components; and an intermediate portion between the first end portion and the second end portion, wherein the intermediate portion is disposed within the headband.

6. The headphone device of claim 5, wherein at least part of the intermediate portion is in a serpentine configuration that comprises a plurality of bends positioned adjacent one another.

7. The headphone device of claim 1, further comprising at least one digital microphone at least partially disposed in at least one of the first earpiece or the second earpiece.

8. The headphone device of claim 1, wherein the first subset of the plurality of electrical components includes the wireless transceiver, and wherein the second subset of the plurality of electrical components includes the power source.

9. The headphone device of claim 8, further comprising a shield at least partially disposed around one or more individual conductors of the plurality of conductors.

10. The headphone device of claim 9, wherein the shield comprises a spiral shield.

11. The headphone device of claim 1, wherein the power source comprises at least one rechargeable battery.

12. A headphone device comprising:

a housing including a first earpiece, a second earpiece, and a headband attached to the first earpiece and to the second earpiece;

a power source at least partially disposed in the first earpiece;

a wireless transceiver at least partially disposed in the second earpiece; and a cable assembly at least partially disposed in the housing and comprising a plurality of conductors at least partially disposed in and extending through the headband, a jacket at least partially enclosing the plurality of conductors, a first termination assembly disposed in the first earpiece, and a second termination assembly disposed in the second earpiece, wherein each of the first and second termination assemblies includes a flexible circuit board including a plurality of conductive traces, and a plurality of terminals coupled to the plurality of conductive traces and to one or more of the plurality of conductors, wherein the plurality of terminals are arranged side-by-side on the flexible circuit board such that ends of the plurality of conductors mechanically connected to the plurality of terminals are aligned along a plane.

13. The headphone device of claim 12, further comprising at least one digital microphone at least partially disposed in the first earpiece and at least one digital microphone at least partially disposed in the second earpiece.

14. The headphone device of claim 12, wherein the plurality of conductors includes one or more power conductors coupled between the power source and the wireless transceiver; and wherein the cable assembly further comprises a shield at least partially separating the one or more power conductors from one or more other conductors of the plurality of conductors, wherein the shield comprises one or more conductors helically extending around at least one of the one or more power conductors.

15. The headphone device of claim 12, wherein the wireless transceiver is configured to facilitate communication via a BLUETOOTH network.

16. The headphone device of claim 15, further comprising at least one BLUETOOTH antenna at least partially disposed in the second earpiece.

17. The headphone device of claim 16, wherein the wireless transceiver is further configured to facilitate communication via a WIFI network; and wherein the headphone device further comprises at least one WIFI antenna at least partially disposed in the second earpiece.

18. A headphone device comprising:

a first earpiece;

a first audio transducer housed within the first earpiece;

a second earpiece;

a second audio transducer housed within the second earpiece;

a plurality of electrical components including a wireless transceiver and a power source, a first subset of the plurality of electrical components being at least partially disposed in the first earpiece and a second subset of the plurality of electrical components being at least partially disposed in the second earpiece; and a cable assembly extending between the first earpiece and the second earpiece, the cable assembly comprising a first termination assembly disposed in the first earpiece, a second termination assembly disposed in the second earpiece, and a plurality of conductors extending between the first termination assembly and the second termination assembly and electrically connecting the first subset of the plurality of electrical components to the second subset of the plurality of electrical components, wherein each of the first termination assembly and the second termination assembly includes a flexible circuit board including a plurality of conductive traces and a plurality of terminals coupled to the plurality of conductive traces, wherein the plurality of conductors are electrically and mechanically connected to the plurality of terminals, and wherein the plurality of terminals are arranged side-by-side on the flexible circuit board such that ends of the plurality of conductors mechanically connected to the plurality of terminals are aligned along a plane.

19. The headphone device of claim 18, wherein each of the first and second subsets of electrical components comprises at least one digital microphone.

20. The headphone device of claim 18, wherein the first subset of the plurality of electrical components includes the wireless transceiver, and wherein the second subset of the plurality of electrical components includes the power source.

* * * * *